Aug. 11, 1931.    J. L. DRAKE    1,818,207
PROCESS OF AND APPARATUS FOR FORMING SHEET GLASS
Filed July 26, 1928
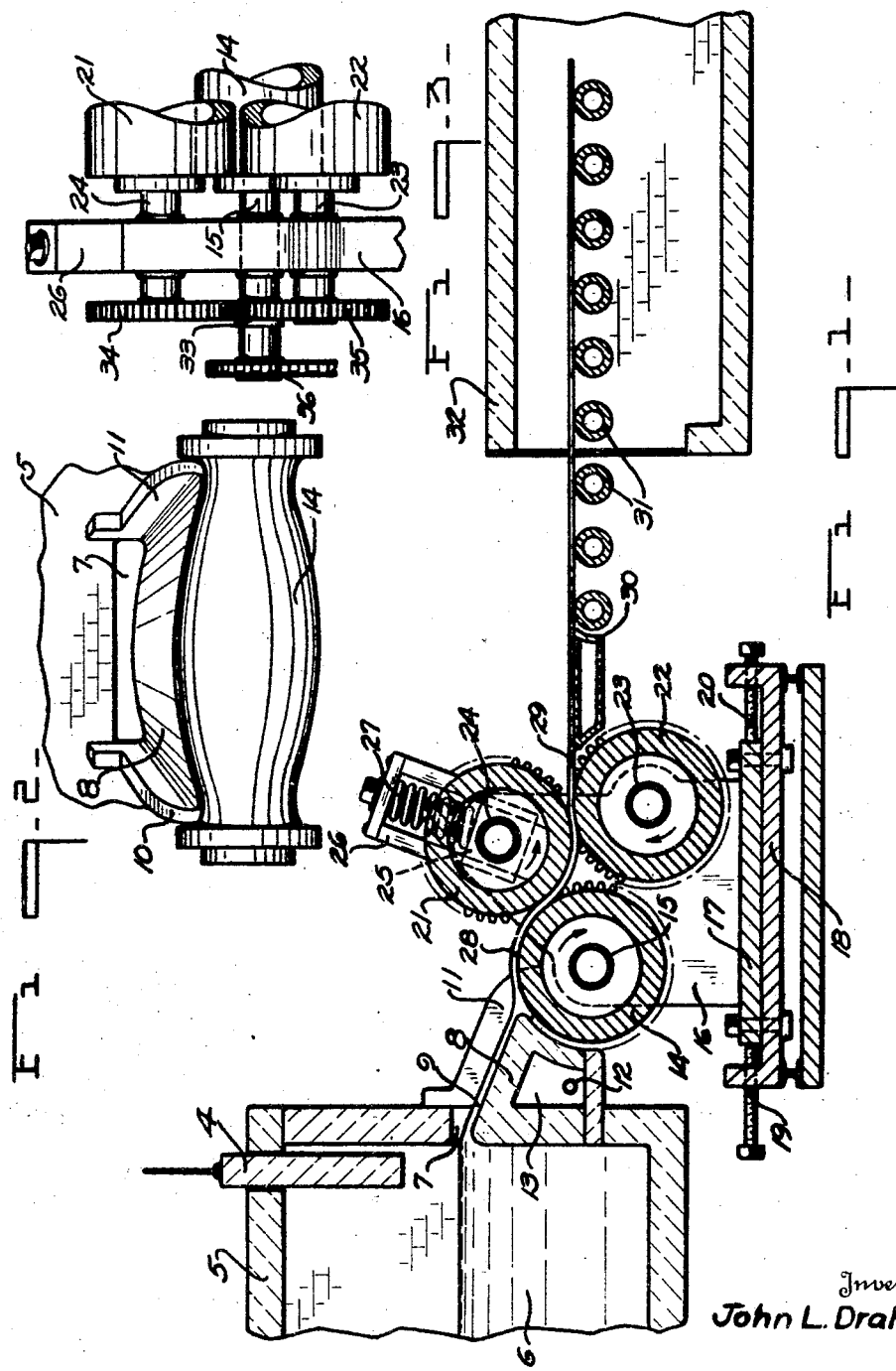
Inventor
John L. Drake
By Frank Fraser
Attorney Patented Aug. 11, 1931

1,818,207

UNITED STATES PATENT OFFICE

JOHN L. DRAKE, OF TOLEDO, OHIO, ASSIGNOR TO LIBBEY-OWENS-FORD GLASS COMPANY, OF TOLEDO, OHIO, A CORPORATION OF OHIO

PROCESS OF AND APPARATUS FOR FORMING SHEET GLASS

Application filed July 26, 1928. Serial No. 295,367.

The present invention concerns broadly the manufacture of flat glass and relates more particularly to an improved process of and apparatus for forming sheet glass especially well adapted for use as plate glass blanks although it is of course not necessarily restricted to such use.

This invention is primarily designed for and is of greatest utility when incorporated in apparatus for receiving a supply of molten glass and rolling the same to a sheet of substantially predetermined dimensions.

An important object of the invention is the provision of an improved process and apparatus for facilitating and improving the delivery of the molten glass from the furnace, or other receptacle within which it is produced, to the sheet forming or rolling mechanism.

Another object of the invention is to provide such a process and apparatus of this nature wherein means, arranged in proximity to the rolling mechanism, is adapted to receive a relatively thick narrow stream of molten glass from a furnace or other receptacle, cause a widening thereof, and then effect the delivery of this widened stream to said rolling mechanism.

Other objects and advantages of the invention will become more apparent during the course of the following description when taken in connection with the accompanying drawings.

In the drawings forming a part of this application and wherein like numerals are employed to designate like parts throughout the same, Fig. 1 is a vertical longitudinal section through apparatus constructed in accordance with the present invention.

Fig. 2 is a front elevation of the spreading table and roll, and

Fig. 3 is a detail view showing the arrangement of the rolls and the means for driving the same.

The numeral 5 designates the exit end of a furnace or other suitable receptacle containing a mass of completely refined molten glass 6, the furnace being provided in one end wall thereof with a relatively narrow horizontal outlet opening 7. Associated with the outlet 7 is an inclined table or apron 8 for receiving the stream of molten glass 9 as it flows therethrough from the furnace, the flow of glass through said outlet being controlled by means of a vertical adjustable gate or shear cake 4.

As will be seen particularly upon reference to Fig. 2, the outlet opening 7 is of such a size that a relatively thick narrow stream of molten glass is caused to flow therethrough. The bottom surface of the inclined table 8 is transversely arched as shown while the side walls 10 and 11 thereof diverge forwardly to the end that as the relatively narrow stream of molten glass 9 is received upon the table 8, the glass will be caused to flow laterally toward the opposite sides thereof and since the side walls diverge forwardly, the stream will gradually become wider as the glass flows downwardly over the table. Thus, the table 8 is adapted to receive a relatively thick narrow stream of molten glass from the furnace and to effect a lateral spreading of the glass to cause a widening of the stream. The temperature of the table or apron 8 and also of the glass thereon may be controlled by means of one or a plurality of burners 12 positioned therebeneath and preferably enclosed within a chamber 13.

Associated with the outer end of the table 8 is a spreading roll 14, said roll extending transversely in front of the table and being of a double tapering construction. That is, the said roll is of greater thickness at its center and gradually tapers towards its opposite ends. The roll 14 is carried by a shaft 15 journaled at its opposite ends in vertical standards 16 supported upon a base 17 slidably mounted upon a supporting structure 18 and adjustable either toward or away from the table upon proper operation of the adjusting screws 19 and 20.

The numerals 21 and 22 designate the sheet forming rolls which are superimposed with relation to one another and are spaced to create a sheet forming pass therebetween. The rolls 21 and 22 are cylindrical so that the sheet forming pass therebtween is straight and provided with parallel sides. The width of the sheet forming pass or, in other words, the distance between the forming rolls 21 and 22 determines the thickness of sheet produced. The roll 22 is also carried by a shaft 23 journaled at its opposite ends in the standards 16 while the roll 21 is carried on a shaft 24 journaled within bearing blocks 25 slidably mounted within guide members 26 and yieldably urged toward the rolls 14 and 22 by means of compression springs 27. It will be noted that the upper forming roll 20 is not directly above the lower forming roll 22 but, on the other hand, is slightly off-set to one side thereof. The guide members 26 are inclined to the vertical in order that the upper forming roll 21 will be urged downwardly between the rolls 14 and 22.

As the widened stream of molten glass 28 flows from the inclined table 8, it is received upon the spreading roll 14 and is then passed between the forming rolls 21 and 22 and reduced thereby to a sheet 29 of substantially predetermined dimensions. When the stream of glass is fed between the forming rolls, it is of a width substantially equal to the length of said rolls. As the sheet issues from between the forming rolls, it is moved over a slab 30 onto a plurality of rolls 31 which serve to support and convey the sheet through an annealing leer 32.

The shaft 15 of roll 14 carries at either end a gear 33 meshing with corresponding gears 34 keyed to the shaft 24 of the roll 21 while the said gears 34 mesh with similar gears 35 on the shaft 23 of roll 22. The roll 14 is preferably positively driven from a suitable source of power through a sprocket and chain connection 36 or the like and this rotatory motion is imparted to the roll 21 through the intermeshing gears 33 and 34 and from the roll 21 to the roll 22 through the intermeshing gears 34 and 35 so that the roll 14 will be driven in a clockwise direction to supply the stream of molten glass to the rolls 21 and 22 which will rotate in opposite directions to reduce the glass to a sheet of substantially predetermined dimensions. Since the width of the stream of molten glass, as it is fed to the forming rolls, is substantially the same as the length of said rolls, the rolling operation can be accomplished more readily and efficiently than if the glass were supplied thereto in a relatively thick narrow stream. The spreading of the glass is accomplished prior to the feeding of the glass to the rolling mechanism and not by the rolling mechanism as is sometimes the case.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In apparatus for the manufacture of sheet glass, a pair of sheet forming rolls, an inclined table having an arched bottom surface and forwardly diverging side walls, and a spreading roll interposed between the table and forming rolls, said table being adapted to receive thereupon a relatively thick narrow stream of molten glass and to effect a widening thereof, the spreading roll being adapted to receive the widened stream from the table and feeding it between the sheet forming rolls.

2. In apparatus for the manufacture of sheet glass, a furnace having an outlet through which is adapted to flow a relatively thick narrow stream of molten glass, an inclined table for receiving the stream of glass from the furnace and causing a widening thereof, a roll for receiving the thus widened stream from the table, and a pair of forming rolls for receiving the stream from the first roll and reducing it to a sheet of substantially predetermined dimensions.

3. In apparatus for the manufacture of sheet glass, a pair of sheet forming rolls, a table having an arched bottom surface and forwardly diverging side walls, and a spreading roll interposed between the table and forming rolls, said table being adapted to receive thereupon a relatively thick narrow stream of molten glass and to effect a widening thereof, the spreading roll tapering from its center towards its opposite ends and being adapted to receive the widened stream from the table and feed it between the sheet forming rolls.

4. In apparatus for the manufacture of sheet glass, a furnace having an outlet through which is adapted to flow a relatively thick narrow stream of molten glass, a table for receiving the stream of glass from the furnace and causing a widening thereof, a roll for receiving the thus widened stream from the table, said roll tapering from its center towards its opposite ends, and a pair of forming rolls for receiving the stream from the first roll and reducing it to a sheet of substantially predetermined dimensions.

5. The process of forming sheet glass, consisting in flowing a relatively thick narrow stream of molten glass upon a stationary surface, causing the glass to spread laterally upon the surface to effect a widening of the stream, receiving the widened stream from said stationary surface and supporting it upon a movable surface, in causing the glass to normally flow towards the opposite ends thereof, and in then passing the glass from the movable surface and rolling it to a sheet of substantially predetermined dimensions.

Signed at Toledo, in the county of Lucas and State of Ohio, this 25th day of June 1928.

JOHN L. DRAKE.